July 27, 1926.

C. B. SHERLOCK

TIDE MOTOR

Filed April 4, 1922      2 Sheets-Sheet 1

1,594,070

INVENTOR
Charles B. Sherlock
By W. W. Williamson, Atty.

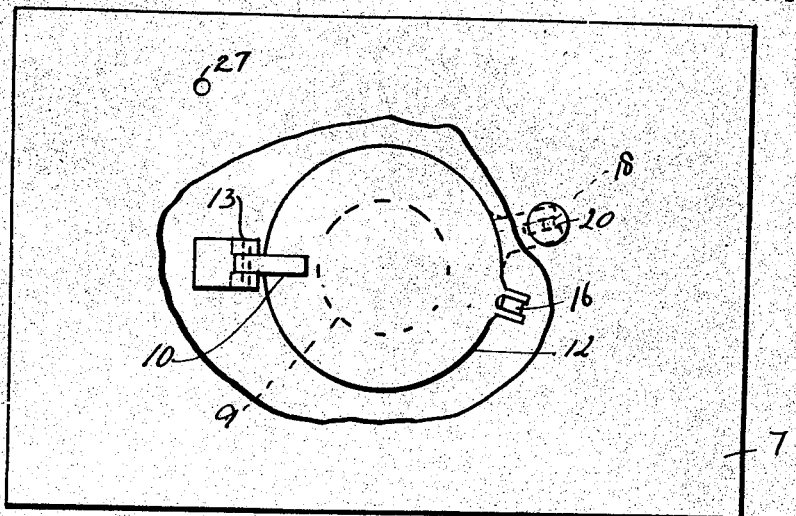
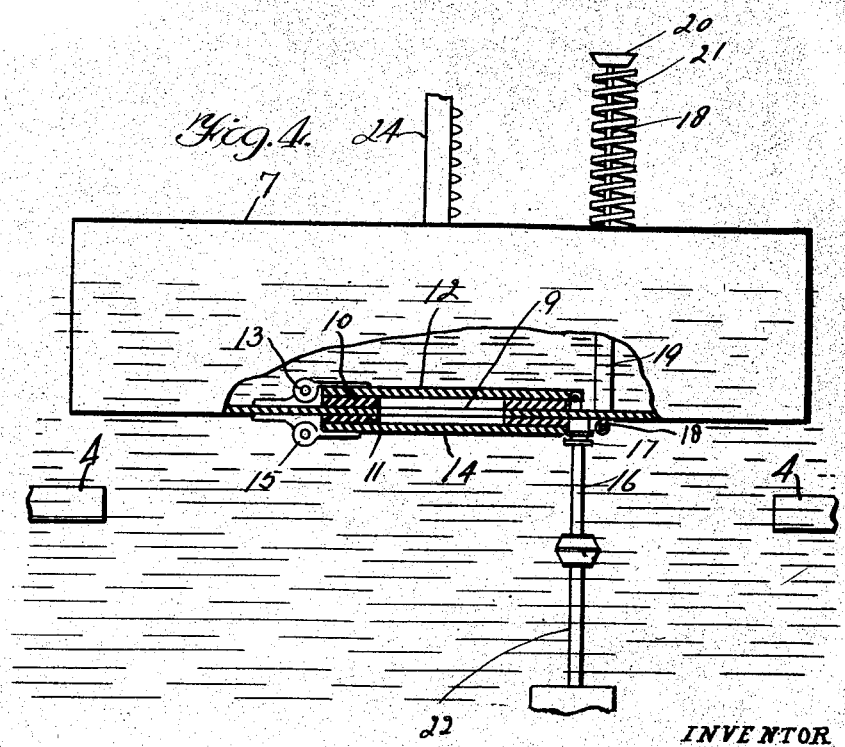

Patented July 27, 1926.

1,594,070

UNITED STATES PATENT OFFICE.

CHARLES B. SHERLOCK, OF PHILADELPHIA, PENNSYLVANIA, ASSIGNOR TO C. B. SHERLOCK PATENT INVESTMENT COMPANY, OF PHILADELPHIA, PENNSYLVANIA.

TIDE MOTOR.

Application filed April 4, 1922. Serial No. 549,549.

My invention relates to new and useful improvements in a tide motor, and has for its primary object the construction of a device of this character whereby the power of tide waters may be translated into mechanical power.

Another object of this invention is the provision of a float having a dual valve structure for the inlet and release of water.

A further object of my invention is to provide a unique means for actuating the dual valve structure.

With these ends in view, this invention consists in the details of construction and combination of elements hereinafter set forth and then specifically designated by the claims.

In order that those skilled in the art to which my invention appertains may understand how to make and use the same, I will describe its construction in detail, referring by numerals to the accompanying drawings forming a part of this application, in which:—

Fig. 3 is a plan view of the float with a portion of the top wall broken away to illustrate constructional details of the dual valve.

Fig. 4 is a fragmentary sectional side elevation of the motor with the float in a position just ready to open for releasing the water at the lowermost position.

Figure 1:
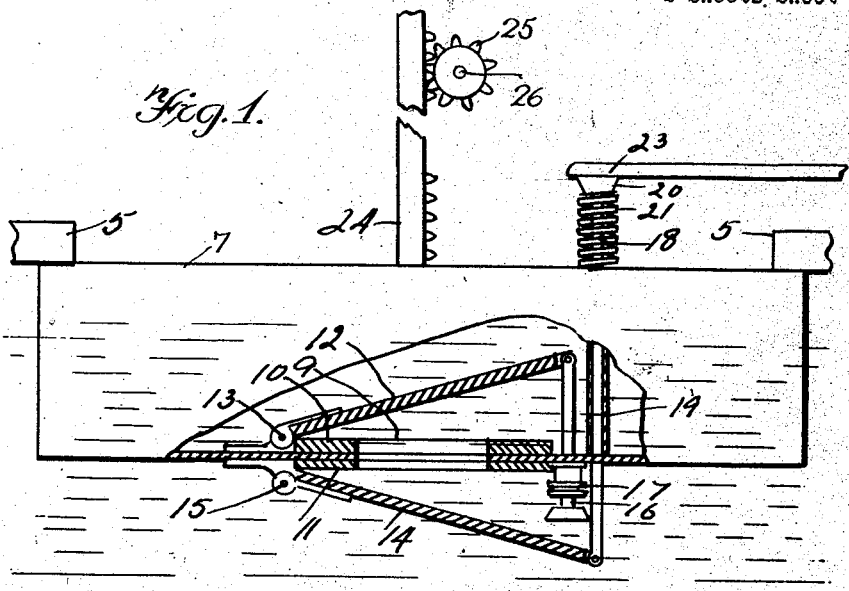
Fig. 1 is a fragmentary vertical sectional side elevation of the motor with the float at its highest position.

In carrying out my invention as here embodied, 4 represents a lower stop and 5 a similar upper stop spaced vertically and between which operates a float 7 due to the rise and fall of tide water.

In the bottom wall of the float is formed an opening 9 which may, if found desirable, be surrounded by two seats 10 and 11, the former on the inside and the latter on the outside. The opening 9 is controlled by a dual valve structure comprising an inner valve 12 coacting with the seat 10 and hinged as at 13 and an outer valve 14 coacting with the valve seat 11 and hinged as at 15. The inner valve 12 is normally maintained in a closed position by gravity and has one end of a rod 16 loosely connected therewith, which rod passes through the bottom wall of the float and depends a suitable distance below the same. Where this rod passes through the float wall it may be packed in any suitable manner such packing being conventionally shown at 17.

To the outer valve 14 is loosely connected one end of the rod 18 which passes through both the top and bottom walls of the float and, if found desirable, may pass through the tube 19 having its ends fixed in the float walls. The rod 18 is provided with a head 20 against which rests one end of a spring 21 while the other end engages the top of the float thus normally holding the outer valve in a closed position. The float may be open at the top but if closed, as herein illustrated an air vent 27 is provided in the top wall.

By loosely connecting the rods 16 and 18 with their respective valves said rods may move vertically while the valves move in the arcs of circles.

Below the float is arranged a striker 22 in the path of travel of the rod 16 while above said float is another striker 23 in the path of travel of the rod 18 for opening the different valves as will be hereinafter more fully explained.

The movements of the float due to the rise and fall of the tide may be utilized in transmitting power thus derived to suitable machinery and as an illustration thereof I have shown the float as provided with a rack 24 meshing with a gear 25 on a driven shaft 26, it being obvious to persons skilled in the art that the power may be transmitted from the shaft 26 in any suitable manner.

Figure 2:
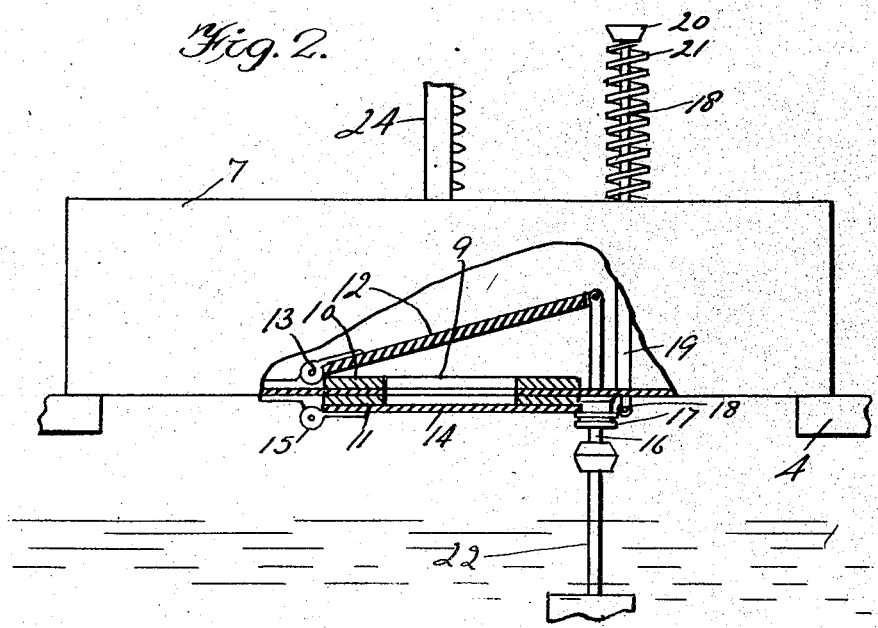
Fig. 2 is a similar view at its lowest position.

Assuming that the tide is rising, the water will lift the float 7 as shown in Fig. 2, the upper valve 12 closing when the rod 16 is no longer in contact with the striker 22 and as soon as the rod 18, or its head 20, contacts with the striker 23 said rod and the outer valve 14 to which the rod is connected will be arrested whereas the continued rise of the tide will lift the float until stopped by the stop 5 so that the outer or lower valve is opened permitting the rising tide waters to rush in through the opening 9 and raise the inner or upper valve 12, but as soon as the float is filled, or at least when the tide begins to turn, the weight of the inner valve and its component parts will cause said valve to close thereby retaining the water.

As the float descends due to the enclosed body of water, the head of the rod 18 will be disengaged from the striker 22, and the action of the spring 21 will close the outer valve 14.

When the float, in its descent, reaches the position shown in Fig. 4, the rod 16 will engage the striker 22 thereby arresting said rod and the inner valve 12 to which it is connected but as the float may continue to descend with the falling tide the opening 9 will be again opened and the weight of the water in the float will force the outer valve 14 away from its seat against the action of the spring 21 until most of the water flows from the float or until such time as the tension of the spring is equal to the enclosed body of water when said valve will be again closed by the spring 21.

As soon as the tide again begins to rise it will lift the float and when the latter has reached a position such as shown in Fig. 4 the inner valve will again close.

From the foregoing description it will be noted that I have provided an exceedingly simple and effective tide motor which may be located any desirable distance inland thereby greatly reducing the possibility of damage due to ocean storms.

Of course I do not wish to be limited to the exact details of construction as herein shown as these may be varied within the limits of the appended claims without departing from the spirit of my invention.

Having thus fully described my invention, what I claim as new and useful is:—

1. A tide motor including a float actuated by the rise and fall of the tide, said float having an opening in its bottom wall, and a dual valve structure controlling said opening said valve structure including two separate valves operative independently of each other.

2. A tide motor including a float actuated by the rise and fall of the tide, said float having an opening in its bottom wall, an outer valve hinged on the outside of the float in the region of the opening, means for normally closing said valve and an inside valve hinged within the float in the region of the opening and normally closed by gravity.

3. A tide motor including a float actuated by the rise and fall of the tide, said float having an opening in its bottom wall, means to arrest the descent of the float before the full fall of the tide, other means to arrest the float before the full rise of the tide, valves hinged on both sides of the bottom wall of the float in the region of the opening therethrough to control said opening, one of said valves being normally closed by gravity, means to normally close the other of said valves, means to arrest one of said valves before the float has reached its lowest position, and means to arrest the other valve before the float has reached its highest position, said valves also being operable by the rush of water in or out of the float.

CHARLES B. SHERLOCK.